Aug. 2, 1966  F. W. ACKERMANN  3,264,095
METHOD AND APPARATUS FOR MELTING OF METALS
TO OBTAIN UTMOST PURITY
Filed Oct. 29, 1962
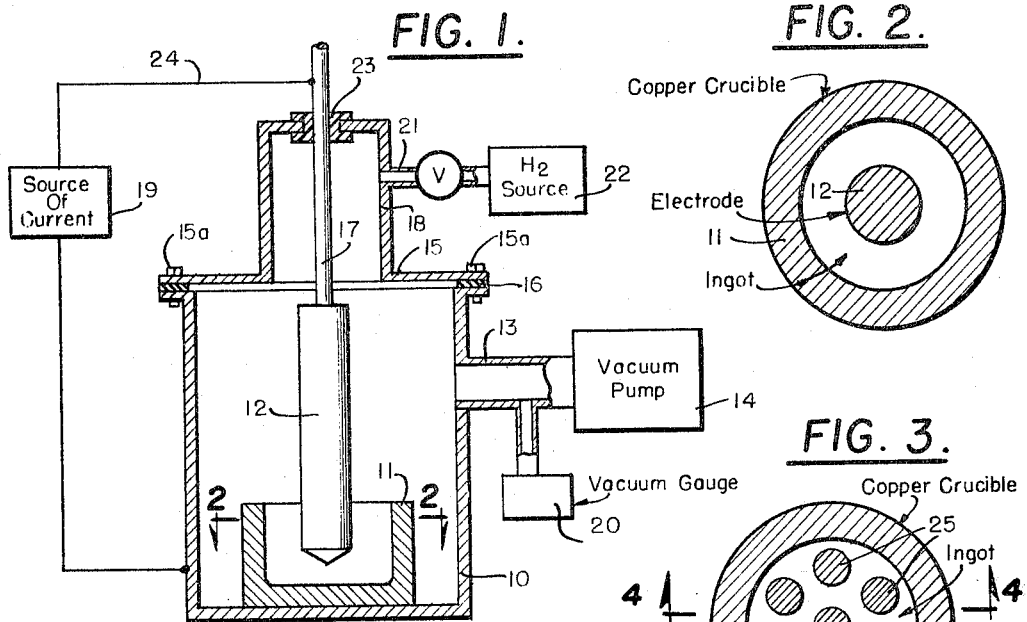
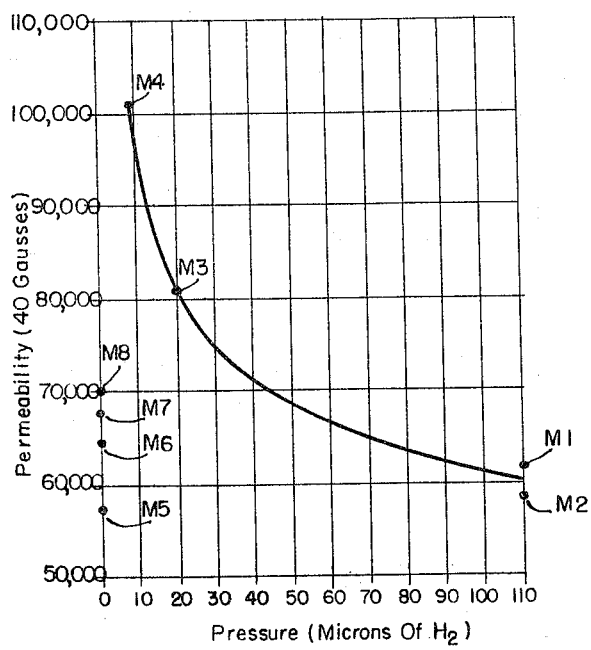
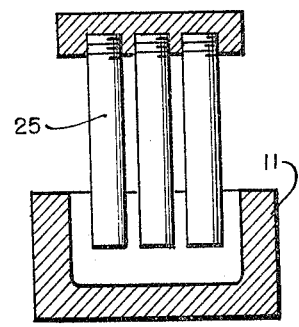
INVENTOR.
Friedrich W. Ackermann
BY
Moore, Hall & Pollock
ATTORNEYS United States Patent Office 3,264,095
Patented August 2, 1966

3,264,095
METHOD AND APPARATUS FOR MELTING OF METALS TO OBTAIN UTMOST PURITY
Friedrich W. Ackermann, Cherry Hill, N.J., assignor to Magnetic Metals Company, Camden, N.J., a corporation of New Jersey
Filed Oct. 29, 1962, Ser. No. 233,535
3 Claims. (Cl. 75—12)

This invention relates to a method and apparatus for obtaining metals with an extremely high degree of purity, and more particularly pertains to a method and apparatus of obtaining high purity metals using a high-vacuum, consumable arc melting furnace.

One of the ever-present goals in the metallurgical art is that of obtaining metals which have the utmost purity. One specific field in the general metallurgical art where the highest degree of purity is essential is that involving the manufacture of soft magnetic parts, particularly those which are to be used in electrical equipment where a very high permeability is essential. One method that has commonly been employed to obtain metals which are as clean as possible is to form the metal to be refined into a shape making it suitable for use as an electrode in an arc furnace. The molten metal of the electrode is collected in a cool metal crucible where it is solidified. The purity of the resulting ingot is dependent, of course, upon the purity of the ingredients of the melt from which the electrode is formed and also upon various other expedients such as the use of a vacuum or a protective atmosphere such as hydrogen.

Prior investigators have found it to be helpful, in obtaining ingots of relatively high purity, to apply a vacuum to the enclosed furnace and introduce hydrogen with a relatively high gas pressure, in the order of 200 microns or so. The hydrogen acts as a reducing agent, and the vacuum is used principally for the purpose of transporting the reduction products out of the neighborhood of the molten material and out of the system. The ingot which results under these circumstances has a fairly high degree of purity, but still is not sufficiently pure to meet the rigid specifications which have been established for certain uses.

I have found that the use of a very much higher degree of vacuum, together with the introduction of hydrogen, with an over-all gas pressure in the arc furnace in the order of five to ten microns produces superior results which apparently comes about principally as a result of the dissociation and ionization of the hydrogen molecules by the extremely high temperature arc. Apparently, the combination of the extremely high arc temperature with the very low hydrogen pressure results in the formation of atomic hydrogen which is extremely effective in reducing even the very stable oxides such as aluminum and magnesium oxide.

In addition, I have found it to be very advantageous to use a consumable arc furnace in which the physical relationship of the electrode is such as to permit the low pressure hydrogen to persist in the immediate area of the arc, thereby permitting the dissociated hydrogen to have its maximum reducing effect on the droplets and vapor of the melting electrode. More specifically, to produce this result, I have found it to be advantageous to provide a plurality of parallel electrodes, spaced from each other, and disposed above the ingot rather than to provide only a single electrode. This has the effect of providing a high ratio of ingot cross-sectional area to electrode cross-sectional area, thereby improving the access of the vacuum and the dissociated hydrogen to the location where it is most needed, i.e., in immediate proximity to the arc.

Thus, it is an object of the present invention to provide a method for obtaining metals of the utmost purity wherein at least one electrode is formed of the metal to be purified, and the electrode is then used as a consumable arc in an arc furnace subjected to a high vacuum and with an additional very low pressure of hydrogen gas.

Another object of the invention is to melt, in a consumable arc furnace, an electrode formed of the material to be purified with an arc temperature above 4000° F. and in a high vacuum with only a low pressure hydrogen gas, in the order of five to ten microns of mercury. In the description that follows and also in the appended claims, it will be understood that a "micron" refers to a gas-pressure which will support a column of mercury having a height of one-thousandth of one millimeter.

Another object of the invention is to provide, in a consumable electrode arc furnace, a plurality of spaced, parallel electrodes formed of the metal to be purified.

In describing the invention, reference will be made to the accompanying drawing, in which:

FIGURE 1 is a cross-sectional view of a typical high vacuum arc furnace of the present invention;

FIGURE 2 is a cross-sectional view taken along the line 2—2 of FIGURE 1;

FIGURE 3 is a side view of a modified form of electrode structure showing the plurality of parallel, spaced electrodes of the present invention;

FIGURE 4 is a cross-sectional view showing the plurality of electrodes of FIGURE 3; and FIGURE 5 graphically illustrates the observed relationship between permeability and hydrogen gas pressure used in the arc furnace.

In FIGURE 1, the furnace is shown as comprising a bottom tank portion 10 which contains both the cylindrical crucible 11 and an electrode 12 which is formed from the metal which is to be purified and is, accordingly, initially made as pure as possible. A pipe 13 communicates with the interior of the cylindrical chamber 10 in order that a vacuum pump 14 may operate to withdraw substantially all of the gases from the interior of the furnace. A vacuum gauge 20 communicates with the pipe 13 so that a continuous measurement of the vacuum may be obtained.

The top of the tank 10 is enclosed by a cover 15 fastened to tank 10 by bolts 15a with airtight sealing between provided by gasket 16. An electrical connection designated by the conductive rod 17 connects to the top end of electrode 12 and extends through the neck portion 18 and through a hermetic sealing means 23, with a connection being made over wire 24 to one terminal of a source of electrical current 19 whose other terminal is connected to the tank 10. Since there is a direct electrical connection between the crucible 11 and tank 10, whereas rod 17 and electrode 12 are electrically insulated from these same parts by means of the electrically insulating gasket 16, an arc may be struck between the electrode 12 and the crucible 11 after which a high level of current may flow between these parts and create sufficient heat to produce a gradual melting of electrode 12. In accordance with common practice, a means (not shown) is provided for raising and lowering the electrode so that a predetermined distance between the bottom of the electrode and the top of the ingot may be maintained. The neck portion 18 has a pipe 21 communicating therewith and with a source 22 of hydrogen gas through valve V. Valve V provides an adjustment of the amount of hydrogen gas flowing through pipe 21 into the interior of the furnace, so that the desired hydrogen gas pressure may be maintained in the furnace as measured by gauge 20.

It has long been recognized that improved results are obtained when the aperture of the crucible is as great as possible relative to the cross-sectional area of the electrode. This is important in order that there shall be a high vacuum in the immediate proximity of the arc itself in order that there can be an effective dissociation and ionization of the hydrogen which can only take place under conditions of low vacuum and high temperature. This also facilitates the access of the dissociated hydrogen to the molten metallic droplets and vapor so that the maximum reducing effect can be experienced. In commercial vacuum-consumable, arc melting furnaces, the highest practical ratio of these cross-sectional areas is in the order of 1.8. However, we have found that when atomic hydrogen is used as a chemical cleansing agent as disclosed herein, it is desirable that the ratio of these cross-sectional areas be four or more.

One of the main reasons why it has not been practicable to have, in the past, a ratio of areas exceeding about 1.8 has been the difficulty in maintaining a molten pool over the whole area of the crucible since this naturally becomes more difficult as the area of the electrodes becomes smaller in relation to the area of the solidified ingot. However, in recognition of the fact that the higher ratios of crucible to electrode cross-sectional areas will produce a more effective cleansing action and are thus more desirable, I have found that it is possible to obtain ratios in excess of four by using a number of parallel, spaced electrodes, each of which may be smaller in cross-sectional area than when a single electrode is used. The spacing of the several electrodes makes it quite possible to maintain the top of the ingot in liquid form even where the ingot area substantially exceeds the sum of the cross-sectional areas of the plurality of electrodes. Moreover, the electrode spacing permits a ready access of the vacuum and the low-pressure hydrogen gas to the arc.

Such an arrangement of spaced parallel electrodes is shown in FIGURES 3 and 4. Each of the electrodes 25 is relatively small in cross-sectional area, and the total of their areas is, as can be seen, substantially smaller than the cross-sectional area of the ingot. Nevertheless, every part of the upper surface of the ingot has an electrode in relatively close proximity thereto so that the plurality of arcs which are formed between the several electrodes and the top of the ingot will be effective to maintain the entire upper surface of the ingot in the molten state. At the same time, however, the spacing between the electrodes readily permits the arcs to be intimately surrounded by regions of high vacuum and low hydrogen gas pressure.

As previously stated, I have found by repeated experimentation that the most advantageous results are obtained when the vacuum is of a very high order and a hydrogen pressure in the order of five to ten microns is maintained. This low hydrogen pressure appears to facilitate the dissociation and ionization of the hydrogen molecules, thereby providing extremely active atoms which are capable of reducing those oxides which, under normal melting conditions, are very stable, such as aluminum and magnesium oxides, for example.

The transformation of the molecular hydrogen into atomic hydrogen naturally requires a substantial amount of energy as does also the cooling effect on the arc of the low-pressure hydrogen. This must be compensated for by increasing the electrical energy so that a sufficiently high temperature will be maintained to produce the desired transformation of the molecular hydrogen into the atomic hydrogen. Thus, I have found in experimentation that when a two-inch electrode of 80 percent nickel-iron steel is melted, using a vacuum of five microns, but with no hydrogen pressure, a current of 1,000 amperes is sufficient to maintain a proper arc. However, when the method of the present invention is used and hydrogen is introduced with a pressure in the order of five to ten microns, the required current must be in the order of 1500–1600 amperes.

It is believed that the extremely high purity which results by the method of the present invention comes about by the accumulation of several different effects. One of the principal effects is what is known as zone refining. Thus, as the arc melts the electrode, and the molten metal forms on the top of the ingot and then solidifies, there is, in effect, a transfer of a highly heated zone through the material, and this zone collects a considerable amount of the impurities and carries them to the top of the bar. In addition, there is the cleaning effect which results from the vacuum treatment, i.e., the removal of the volatile materials by applying arc temperatures and a high vacuum. The method of the present invention adds to these the very important effect resulting from a chemical reaction between the atomic hydrogen and the impurities in the metal which form volatile products that are carried away by the vacuum.

It is well-known that the attainment of extremely high permeabilities in magnetic metals is dependent upon obtaining a metal with an extremely high degree of purity. FIGURE 5 graphically illustrates the relationship between the permeabilities that have been obtained with different melts of a permalloy type material as a function of the hydrogen gas pressure employed. The same chemical composition was maintained in all heats. This graphic representation was obtained by plotting a number of different results, each representing a different heat where a different value of hydrogen pressure existed and then drawing a curve through certain of those points. The plotted points representing heats M1 and M2 show that the permeability is fairly low when the hydrogen pressure is in the order of 110 microns. When the hydrogen pressure is considerably reduced to the level of twenty microns, the permeability increases quite appreciably as shown by the plotted point representing heat M3. The most advantageous results are represented by the plotted point representing heat M4 wherein a permeability of 100,000 was obtained with a hydrogen pressure of approximately eight microns. Although it might be believed that still lower hydrogen pressures would produce still higher points on the curve representing higher permeability values, this is not the case since then there are apparently not sufficient hydrogen molecules present to provide an adequate amount of atomic hydrogen. This is also represented in FIGURE 5 where the plotted points representing heats M5–M8 show the very much lower permeability values that resulted when no hydrogen gas at all was admitted to the furnace.

In the preferred embodiment of my method, I use a very high vacuum and a hydrogen gas pressure in the range of five to fifteen microns. One practical way to obtain the desired conditions is to exhaust the furnace with the vacuum pump while permitting a controlled amount of hydrogen to enter. I prefer, however, to first exhaust the furnace insofar as possible with the vacuum pump and thereafter admit hydrogen gas to obtain the desired pressure of five to fifteen microns. This latter procedure avoids any possibility of obtaining dangerous hydrogen-air mixtures.

Having described an improved method and apparatus for obtaining metals of the utmost degree of purity in a consumable arc-melting furnace, I wish it to be understood that various adaptations and modifications may be made to my invention without departing from the spirit or scope of this invention.

What I claim is:

1. The method of purifying a magnetic metal to reduce to a minimum its impurities particularly metallic oxides and thereby increase its permeability to a maximum comprising the steps of, forming an elongate electrode of the metal to be purified, melting said electrode at a temperature of at least 4000° F. in a reducing atmosphere of hydrogen and with a pressure of about five to fifteen microns, and freezing the molten metal in a crucible.

2. The method of purifying a magnetic metal to reduce to a minimum its impurities particularly metallic oxides and thereby increase its permeability to a maximum comprising the steps of, forming a plurality of elongate electrodes of the metal to be purified, positioning said plurality of electrodes substantially parallel to each other and with one end of each adjacent to and substantially equidistant from the bottom inner surface of a crucible formed of the metal being reduced, maintaining an electric arc between said electrodes and said crucible in a reducing atmosphere of substantially only hydrogen at a pressure of about 5 to about 15 microns, and freezing the molten purified metal.

3. The method of claim 2 in which the temperature in the region of said arc is about 4000° Fahrenheit.

References Cited by the Examiner

UNITED STATES PATENTS

| | | | |
|---|---|---|---|
| 2,110,569 | 3/1938 | Cioffi | 75—59 |
| 2,154,737 | 4/1939 | Erdmann | 13—9 |
| 2,167,575 | 7/1939 | Kelly | 13—9 |
| 2,992,094 | 7/1961 | Powell et al. | 75—10 |
| 3,021,562 | 2/1962 | Chisholm et al. | 75—10 |
| 3,052,576 | 9/1962 | Josso | 148—31.55 |
| 3,058,820 | 10/1962 | Whitehurst | 75—10 |

OTHER REFERENCES

Vacuum Melting of Steels, Blast Furnace and Steel Plant, March 1959, pages 281–290.

DAVID L. RECK, *Primary Examiner.*

HYLAND BIZOT, H. F. SAITO, *Examiners.*